*US008818207B2*

United States Patent
Tanaka et al.

(10) Patent No.: US 8,818,207 B2
(45) Date of Patent: Aug. 26, 2014

(54) OPTICAL TRANSMITTER

(75) Inventors: Toshiki Tanaka, Kawasaki (JP); Tomoo Takahara, Kawasaki (JP); Shoichiro Oda, Kawasaki (JP); Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 96 days.

(21) Appl. No.: 13/347,405

(22) Filed: Jan. 10, 2012

(65) Prior Publication Data

US 2012/0230694 A1    Sep. 13, 2012

(30) Foreign Application Priority Data

Mar. 10, 2011    (JP) ................................. 2011-053566

(51) Int. Cl.
| | |
|---|---|
| H04B 10/04 | (2006.01) |
| H04B 10/50 | (2013.01) |
| H04J 14/02 | (2006.01) |
| H04B 10/532 | (2013.01) |
| H04L 5/12 | (2006.01) |
| H04L 5/00 | (2006.01) |
| H04L 27/26 | (2006.01) |
| H04L 27/20 | (2006.01) |

(52) U.S. Cl.
CPC ............ *H04J 14/026* (2013.01); *H04L 5/0008* (2013.01); *H04B 10/506* (2013.01); *H04B 10/532* (2013.01); *H04L 27/2642* (2013.01); *H04L 27/2096* (2013.01); *H04J 14/0298* (2013.01); *H04L 27/2637* (2013.01); *H04L 5/12* (2013.01); *H04L 27/2697* (2013.01)
USPC ............................ 398/196; 398/195; 398/182

(58) Field of Classification Search
USPC ........................................................ 398/196
See application file for complete search history.

(56) References Cited

U.S. PATENT DOCUMENTS 6,661,975 B1 * 12/2003 Hall et al. .................... 398/180
7,650,080 B2 * 1/2010 Yap et al. ..................... 398/183

(Continued)

FOREIGN PATENT DOCUMENTS

| JP | 2001136098 A | * 5/2001 |
|---|---|---|
| JP | 2001-249367 | 9/2001 |

(Continued)

OTHER PUBLICATIONS

Ryf et al., Wavelength Blocking Filter With Flexible Data Rates and Channel Spacing, Jan. 2005, IEEE, Journal of Lightwave Technology, vol. 23, No. 1, pp. 54-61.*

(Continued)

*Primary Examiner* — Ken Vanderpuye
*Assistant Examiner* — Jai Lee
(74) *Attorney, Agent, or Firm* — Fujitsu Patent Center

(57) ABSTRACT

A clock signal from a single reference clock is frequency converted, and the frequency-converted signal is input to an equal-interval-optical-frequency-comb generator and a modulator of an optical modulator. By varying the electric frequency of the clock signal input to the equal-interval-optical-frequency-comb generator, frequency intervals of a frequency comb to be generated can be varied, while by selectively employing a particular optical frequency from among the continuous light beams of the generated frequency comb, a frequency comb having unequal intervals can be generated. It is also possible to vary the modulation rate by varying the clock frequency of a driving signal to be input to the optical modulator. By using a clock signal of a single reference clock, the frequency intervals of the frequency comb and the variation of the modulation rate synchronize with each other.

13 Claims, 13 Drawing Sheets

(56) References Cited

U.S. PATENT DOCUMENTS

| | | | |
|---|---|---|---|
| 2006/0126993 A1* | 6/2006 | Piede et al. | 385/14 |
| 2007/0047970 A1* | 3/2007 | Tsuji | 398/198 |
| 2008/0212974 A1* | 9/2008 | Davies et al. | 398/140 |

FOREIGN PATENT DOCUMENTS

| | | |
|---|---|---|
| JP | 2002-062514 | 2/2002 |
| JP | 2009-244304 | 10/2009 |
| JP | 2010-124320 | 6/2010 |

OTHER PUBLICATIONS

Ryf, Wavelength Blocking Filter with Flexible Data Rages and Channel Spacing, 2005, IEEE, pp. 54-61.*

Baxter, G. et al., "Highly programmable Wavelength Selective Switch", OTuF2, OFC2006; Sep. 2006.

Chandrasekhar, S. et al., "Terabit Superchannels for High Spectral Efficiency Transmission", Tu.3.C.5, ECOC Sep. 2010, pp. 19-23.

* cited by examiner

| SIGNAL OBTAINMENT SOURCE | CONTROL INFORMATION |
|---|---|
| TRANSMISSION PROPERTY MONITOR | OPTICAL SNR |
| | NON-LINEAR PENALTY |
| | CUMULATIVE WAVELENGTH DISPERSION |
| | TRANSMISSION-BANDWIDTH REDUCTION PENALTY |
| NMS/EMS、 CONTROL PLANE | REQUIRED TRANSMISSION VOLUME |
| | REQUIRED TRANSMISSION DISTANCE |
| | APPLICABLE TRANSMISSION BANDWIDTH |
| | (CONTRACT/DEGREE OF OCCUPANCY) |
| | FIBER TYPE |
| | (TRANSMISSION LOSS/Aeff/WAVELENGTH DISPERSION) |
| | SPAN LENGTH |
| | RELAY NODE INFORMATION |
| | FILE INPUT POWER/TRANSMISSION BANDWIDTH/NUMBER OF STAGES |
| | MODULATION METHODS/MODULATION RATES OF ADJACENT CHANNELS |

FIG. 4

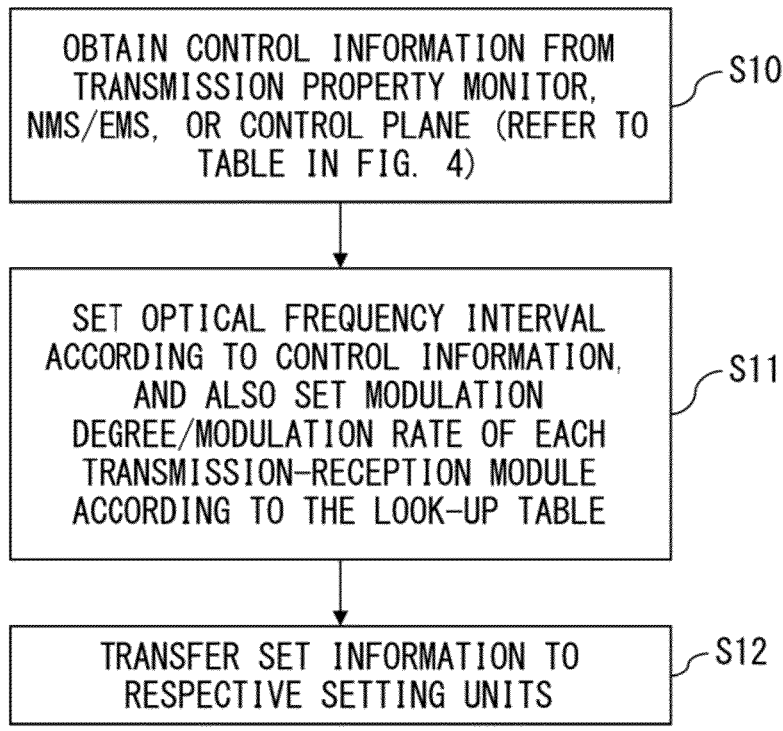
F I G. 5

OPTICAL TRANSMITTER

CROSS-REFERENCE TO RELATED APPLICATION

This application is based upon and claims the benefit of priority of the prior Japanese Patent Application No. 2011-053566, filed on Mar. 10, 2011, the entire contents of which are incorporated herein by reference.

FIELD

The embodiments discussed herein are related to an optical transmitter used in an optical communication system.

BACKGROUND

As the widespread use of the Internet and mobile phones has increased communication capacities in recent years, backbone optical communication systems have been required to have larger capacities, and research and development have been carried out for optical transmitter-receivers having a communication capacity of 40 Gbit/s, 100 Gbit/s or higher for a single wavelength.

However, if a transmission capacity per single wavelength is increased, the quality of transmitted signals deteriorates greatly due to a lowered OSNR (Optical Signal to Noise Ratio), waveform distortions caused by wavelength dispersion on transmission paths, polarization mode dispersion, nonlinear effects, and the like.

Accordingly, digital coherent receiving schemes resistant to poor OSNR and also resistant to waveform distortions on transmission paths have been gathering attention as schemes for optical communication systems yielding 40 Gbit/s or higher.

According to conventional receiving schemes, ON and OFF settings based on light intensities are assigned to binary signals to be used for direct detection (OOK: On-OFF Keying). By contrast, according to digital coherent receiving schemes, light intensity and phase information are extracted using a coherent receiving system, and the extracted light intensity and phase information are quantized using an analog/digital converter (ADC), and thereby demodulation is performed by a digital signal processing circuit.

Digital coherent receiving schemes are capable of improving resistance to poor OSNR by using coherent receiving schemes, and are capable of compensating for waveform distortions by using a digital signal processing circuit, and accordingly are capable of suppressing deteriorations in the quality of transmitted signals even when a communication capacity for one wavelength is large. Also, wavelength distortions may be compensated for by a digital signal processing circuit, which enables relatively flexible responses to transmission route modifications caused by network configuration modifications.

Further, digital coherent receiving schemes can be combined with modulation schemes capable of transmitting multi-bit information for one symbol so as to construct transmission systems yielding high-frequency efficiencies. As modulation schemes of this type, multivalued modulation schemes such as QPSK (quadri-phase shift keying), 8PSK, 16QAM, and 256QAM that multiply phase information and intensity information, a polarized multiplexing scheme that multiplexes different information onto orthogonal polarized waves, a multi-carrier multiplexing scheme that multiplexes different information onto a plurality of frequencies that have been multiplexed highly densely within one wavelength grid (subcarriers), etc., are known. As typical examples of multi-carrier multiplexing schemes, there are Frequency Division Multiplexing (FDM) and Orthogonal Frequency Division Multiplexing (OFDM). As a method of realizing OFDM, there is a method, as described in non-Patent Document 1, in which a plurality of phase synchronized subcarrier signals (multi-frequency light sources) are modulated.

There are also active discussions on techniques for flexibly modifying network configurations so as to improve the use efficiency of network capacities, and digital coherent receiving schemes capable of performing flexible compensation for linear waveform distortions are gathering attention.

However, in order to respond to requests from users of a network, not only the traffic volume of the network, but also a place to which data is to be transmitted (transmission distance) has also to be considered. Thus, flexible responses to such requests are also needed. Also, conditions of systems that transmit signals (such as an optical SNR, a nonlinear effect, wavelength arrangements, and the like) vary depending upon networks. Flexible responses to such a variety of conditions are also desired.

In order to respond to requests such as those described above, it is desirable to be able to flexibly vary operations of transmission units such as modulation scheme, modulation rate (Baud Rate), etc. in response to system requirements (capacity, bandwidth, and distance) and conditions (optical SNR and non-linear effects).

FIGS. 1 and 2 explain conventional techniques.

FIG. 1(*a*) illustrates a conventional example of a frequency arrangement using a multi-frequency light source. In FIG. 1(*a*), OOK signals of 10 Gb/s, DPSK signals of 40 Gb/s, and FDM-QPSK signals of 100 Gb/s are disposed, and these signals are not arranged in a right order in view of frequencies, causing interference between adjacent signal bandwidths and thus signal deterioration. Accordingly, as illustrated in FIG. 1(*b*), signal bandwidths are assigned in such a manner that signals modulated in similar modulation schemes are adjacent to each other to the extent possible. In FIG. 1(*b*), there are signals of 1.12 Tb/s, signals of 440 Gb/s, and signals of 100 Gb/s, and they are arranged as groups in three signal bandwidths, respectively. It is desirable to transmit signals using the fewest possible number of signal bandwidths that contain signals modulated by a plurality of different modulation schemes by varying flexible modulation schemes of individual frequencies.

FIG. 2 illustrates a configuration example of a conventional transmitter that uses a multi-frequency light source.

A single-frequency light is output from a laser 10 as depicted by (a). The single-frequency light output from the laser 10 is converted, by a multi-carrier generator 11, into light having a plurality of frequency carriers as depicted by (b). A demultiplexer 12 demultiplexes respective frequencies generated by the multi-carrier generator 11, and outputs those frequencies to a modulator 13. In this example, a polarization-diversity I/Q modulator array 13 is represented as an example of a modulator. This modulator 13 performs modulation using an I signal and a Q signal, and superposes different signals onto orthogonal polarized waves to output them. Optical signals from the modulator 13 are multiplexed by a coupler 14 to be output. The frequency spectrum of optical signals being output has widths around the respective frequencies due to the modulation as depicted by (c).

When an OFDM signal is applied using a multi-frequency light source described in non-Patent Document 1, it is possible to vary the modulation scheme (multi-valued degree) of each subcarrier and the number of subcarriers so as to respond to the traffic volume of networks. However, a single OFDM signal has a fixed frequency difference between the carriers and a fixed Baud Rate, which prevents a flexible and sufficient response to requests that are made for satisfying system requirements.

For a transmitter using a multi-frequency light source, it is necessary to be able to vary the multi-valued degree of each subcarrier and the number of subcarriers, to vary the frequency difference between respective subcarriers and the Baud Rate of each subcarrier in addition to responding to increases or decreases in the traffic volume, and to apply a different Baud Rate to subcarriers so that changes in transmission distances can be responded.

As conventional techniques, there is a technique by which single-carrier-signal generation units are made to respond to a plurality of wavelength bandwidths so as to increase the number of single-carrier-signal optical bandwidths, a technique by which one of the phases of two LDs are controlled in response to detected phase signals in order to increase the number of channels, a technique by which light other than an optical pulse is suppressed by using an optical gate in order to improve the optical SNR, and a technique by which two pulse light generation circuits having the same frequency for repeating pulse light but different oscillation frequencies are used in order to generate a multi-wavelength light having a broad bandwidth and equal frequency intervals utilizing the nonlinear optical effect.

Patent Document 1: Japanese Laid-open Patent Publication No. 2010-124320
Patent Document 2: Japanese Laid-open Patent Publication No. 2009-244304
Patent Document 3: Japanese Laid-open Patent Publication No. 2002-062514
Patent Document 4: Japanese Laid-open Patent Publication No. 2001-249367
non-Patent Document 1: "Terabit Superchannels for High Spectral Efficiency Transmission", S. Chandrasekhar, et. al., Tu.3.C.5, ECOC2010.

SUMMARY

An optical transmitter according to an aspect of embodiments described below includes a reference clock to oscillate a clock signal, a multi-frequency phase-synchronized light source to generate a plurality of continuous light beams having synchronized optical phases of optical carrier waves and to operate in accordance with the clock signal having a converted frequency so as to be able to vary an optical frequency interval thereof, a frequency selection demultiplexer to selectively transmit the plurality of continuous light beams generated by the multi-frequency phase-synchronized light source so as to demultiplex the transmitted continuous light beams, and a plurality of optical modulators to operate in accordance with the clock signal having a converted frequency so as to be able to vary, separately for each optical frequency, a modulation rate of a modulation signal for modulating a carrier wave for each optical frequency from the frequency selection demultiplexer.

According to embodiments described below, it is possible to provide an optical transmitter that enables applications of modulation rates different among subcarriers, and that is capable of responding to changes in transmission distances, or the like.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates control operations performed by a transmission control unit depicted in the configuration example in FIG. 3 (first);
FIG. 5 illustrates control operations performed by a transmission control unit depicted in the configuration example in FIG. 3 (second)

DESCRIPTION OF EMBODIMENTS

Figure 1:
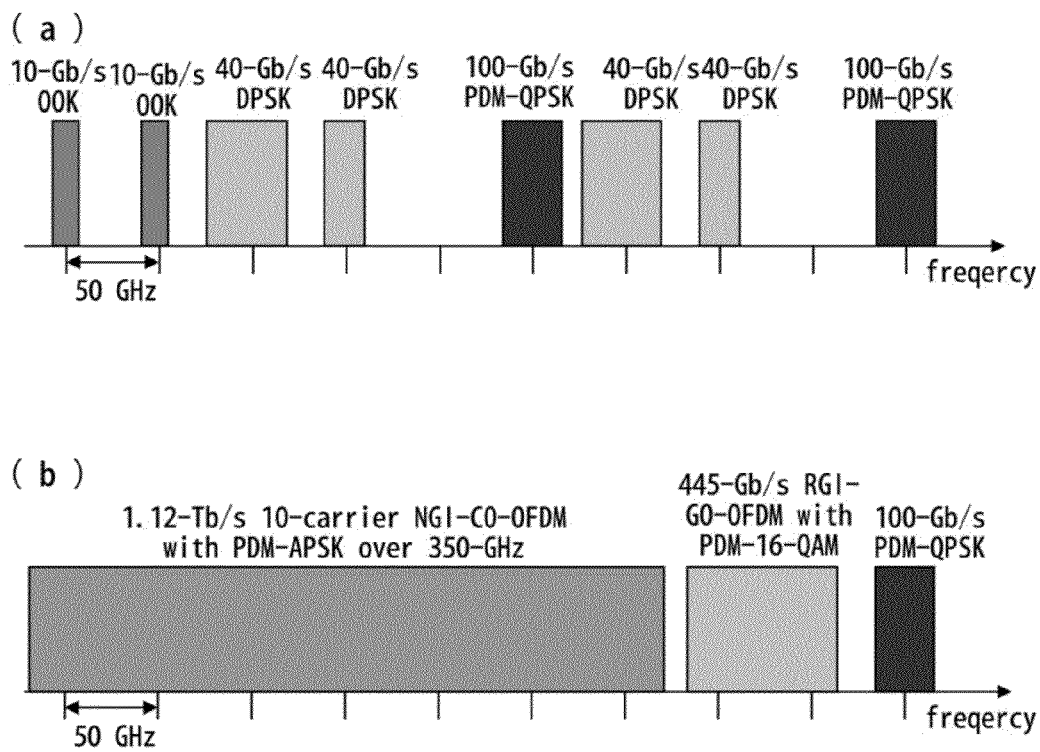
FIGS. 1(*a*) and 1(*b*) illustrate conventional techniques (first)

In the present embodiment, a multi-frequency phase-synchronized light source, a frequency interval setting unit, and an optical modulator are provided. The multi-frequency phase-synchronized light source is capable of generating a plurality of continuous light beams having synchronized optical phases of optical carrier waves, and varying their optical frequency intervals. The frequency interval setting unit performs setting so that an interval of the multi-frequency phase-synchronized light source is varied for each frequency. The optical modulator varies a modulation rate for each optical frequency for a modulation signal that modulates the carrier wave of each optical frequency of the multi-frequency phase-synchronized light source. Then, this configuration is operated using clock signals output from a single oscillator so that the set frequencies of the optical frequency intervals and the frequencies of modulation of the optical modulator are synchronized with each other.

According to the present invention, by contrast to conventional optical communication networks, it is possible not only to respond to changes in traffic volume, but also to flexibly respond to dynamic changes in a range over which networks can be connected, increasing the flexibility and expandability of networks or transmission units.

In a system in which an OFDM technique is applied to the present embodiment, when frequency fluctuation has caused a drift between optical frequency intervals and the frequencies of electrical modulation of a modulator, the OFDM conditions are not satisfied, leading to greater interference between subcarriers. Also, in a system applying different Baud Rates to subcarriers, when frequency fluctuation has made the optical frequency interval smaller than the electrical modulation frequency, interference becomes greater. Also, when an OFDM technique is used and a better property is to be attained, it is necessary for frequencies of transmitters and receivers to be synchronized with each other. Accordingly, by employing a configuration in which transmitter-receivers use reference synchronization signals (clock signals output from a single oscillator serving as a reference), it is possible to reduce the variability of frequencies, and to simplify the frequency synchronization.

Hereinafter, the present embodiment will be explained by referring to the drawings.

Figure 3:
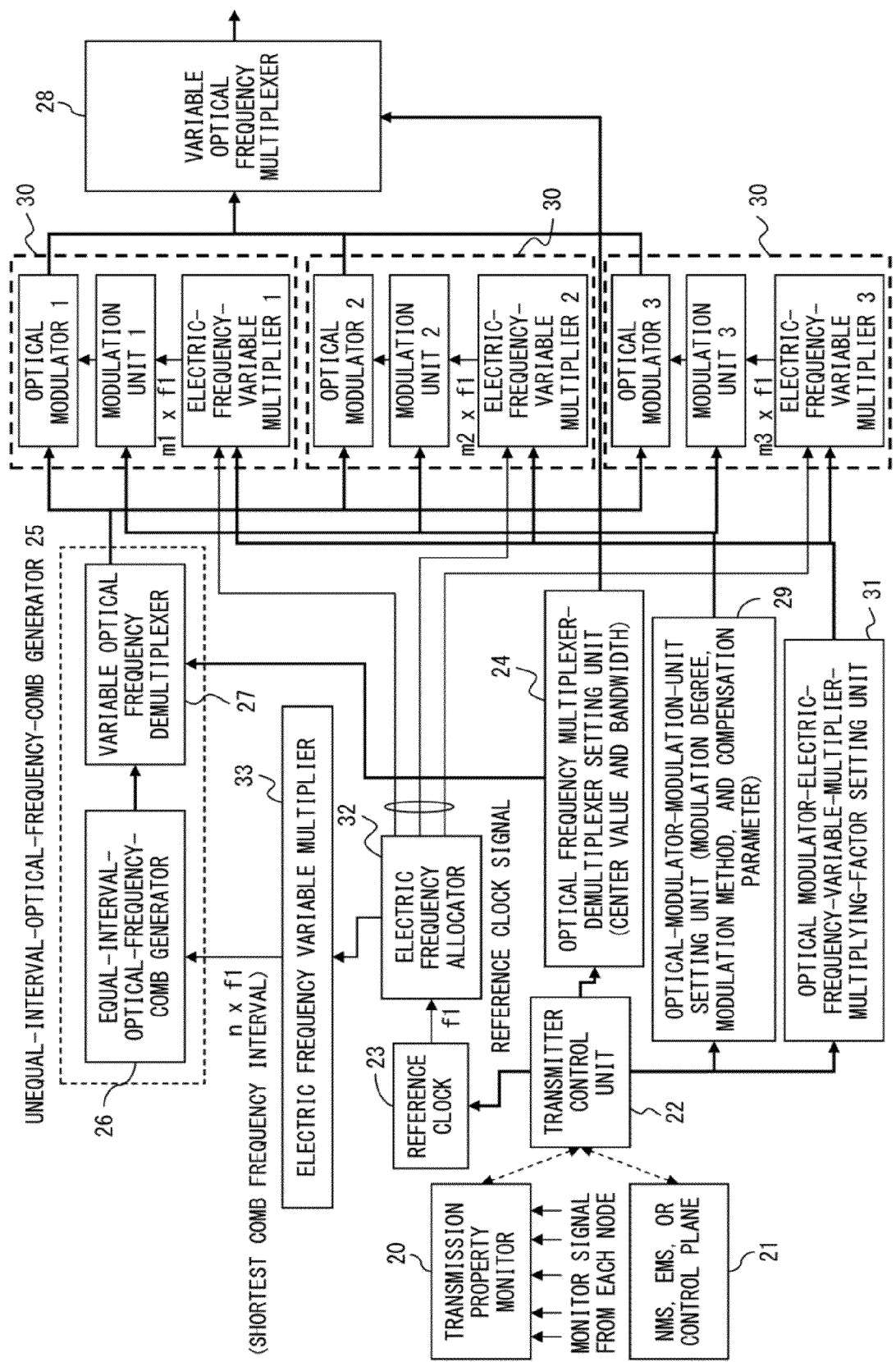
FIG. 3 illustrates a configuration example of a present embodiment.

FIG. 3 illustrates a configuration example of the present embodiment.

A monitor signal from a transmission property monitor 20 that has collected monitor signals (an optical SNR, waveform distortions, or the like caused by cumulative wavelength dispersion and a non-linear penalty) of a reception signal from each node of the optical communication network, and customer requests collected from an NMS (Network Management System) and an EMS (Element Management System), or a control plane 21, information about the modulation methods/wavelength intervals of adjacent channels, information about transmission paths, setting information for nodes, and the like are transferred to a transmitter control unit 22.

The transmitter control unit 22 determines, according to the above information, the optical frequency interval, the modulation method (multi-valued degree) and the Baud Rate of each optical modulator in order to set a reference clock 23 serving as a reference and to transfer a request to each setting unit.

According to a control signal output from an optical frequency multiplexer-demultiplexer setting unit 24, a transmissive/non-transmissive optical frequency or an optical frequency bandwidth is set in a variable optical frequency demultiplexer 27 so that a prescribed optical signal can be extracted from an optical signal output from an equal-interval-optical-frequency-comb generator 26 of an unequal-interval-optical-frequency-comb generator 25. Thereby, among a plurality of continuous light beams having equal frequency intervals output from the unequal-interval-optical-frequency-comb generator 25, only continuous light beams having particular frequencies are transmitted, and thereby a plurality of continuous light beams having equal frequency intervals can be generated. Also, a transmissive/non-transmissive optical frequency is set in a variable optical frequency multiplexer 28. Thereby, it is made possible to select an optical signal having a frequency that is to be used.

As an example of the variable optical frequency demultiplexer 27, an example described in "Highly programmable Wavelength Selective Switch based on Liquid Crystal on Silicon switching elements", G. Baxter et al. OTuF2, ECOC2010, and an example in which a wavelength multiplexer-demultiplexer and an optical switch are combined are known.

Figure 2:
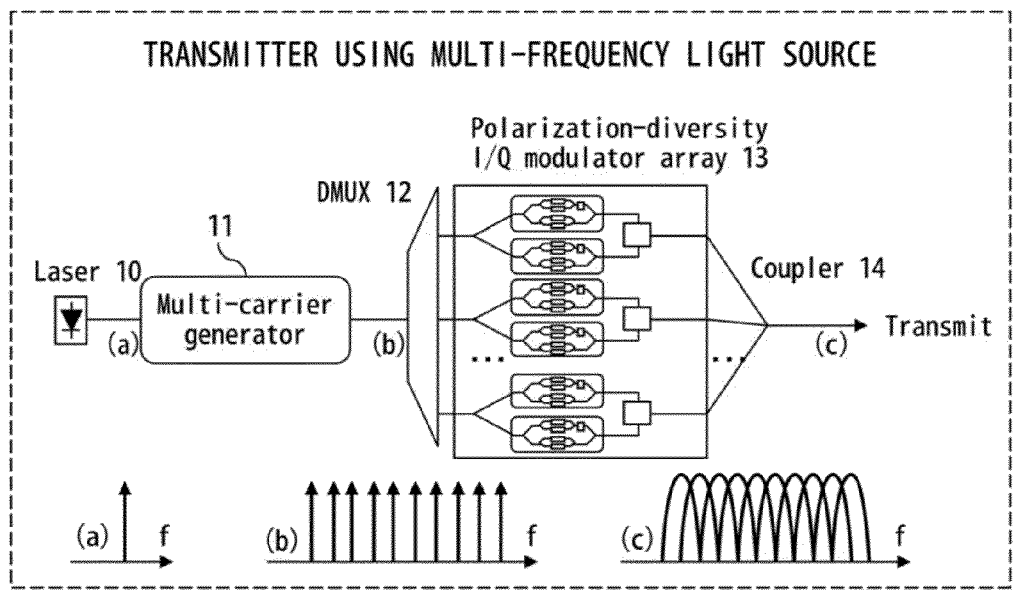
FIG. 2 illustrates a conventional technique (second)

A configuration example of the equal-interval-optical-frequency-comb generator 26 is illustrated in FIGS. 2, 3, and 4, and the explanation thereof is described in Patent Document 1 above. An "optical frequency comb" is a name according to the fact that a continuous light beam having a plurality of optical frequencies arranged on an optical frequency axis look like a comb.

Also, a configuration including the equal-interval-optical-frequency-comb generator 26 and the variable optical frequency demultiplexer 27 so as to generate a prescribed optical frequency comb has been explained, whereas they may be replaced by a single unequal-interval-optical-frequency-comb generator. As a single unequal-interval optical frequency comb, a device having the same configuration as the equal-interval-optical-frequency-comb generator 26 so as to block a continuous light beam having unnecessary frequencies in a generated optical frequency comb may be employed.

A control signal (including a modulation degree, a modulation method, and a compensation parameter) output from an optical-modulator-modulator setting unit 29 is used to set the multi-valued degree and the output amplitude of modulators 1 through 3 (although there are three modulators in this example, as many modulators as necessary are provided in actual configurations) in each transmission module 30.

A control signal output from an optical modulator electric-frequency-variable-multiplier multiplying-factor setting unit 31 is used to set the Baud Rate used in the modulators 1 through 3 in each transmission module 30. Baud Rate is set according to the multiplying factor of electric frequencies set by electric-frequency-variable multipliers 1 through 3. The multiplying factor of an electric frequency is used to set what a frequency of a clock signal output from the reference clock 23 is to be multiplied by. By operating the modulators 1 through 3 at thus-varied electric frequencies, the operation speed of the optical modulators 1 through 3 may be varied and the Baud Rates of output optical signals are varied.

A clock signal from the reference clock 23 that has been set is input to an electric frequency allocator 32, and the electric frequency allocator 32 allocates the signals to the equal-interval-optical-frequency-comb generator 26 and each transmission module 30.

The frequency of a clock signal input to the equal-interval-optical-frequency-comb generator 26 may be varied by an electric-frequency-variable multiplier 33. When the frequency of the reference clock 23 is f1 and the variable multiplying factor of the electric-frequency-variable multiplier is n, frequency intervals of continuous light beams having respective frequencies generated by the equal-interval-optical-frequency-comb generator 26 may be varied within the range of n×f1.

Also, an electric signal that has been input to each transmission module 30 is input to the electric-frequency-variable multipliers 1 through 3 in each module, and the frequency of the signal is varied according to the set multiplying factor, and that frequency is used to make each optical modulator perform modulation operations. The variable multiplying factors of the electric-frequency-variable multipliers 1 through 3 may be values different from each other such as m1, m2, and m3. Thereby, an optical signal based on a Baud Rate unique to each subcarrier may be generated.

The electric-frequency-variable multiplier 33 and the electric-frequency-variable multipliers 1 through 3 may be frequency multipliers that multiply frequency or may be frequency dividers that reduce frequency.

A clock from the reference clock 23 that has been subjected to frequency conversion by the electric-frequency-variable multiplier 33 is applied to the equal-interval-optical-frequency-comb generator 26, and a clock from the reference clock 23 that has been subjected to frequency conversion by the electric-frequency-variable multipliers 1 through 3 is applied to the optical modulators 1 through 3 via the modulators 1 through 3. As described above, clock signals to be input to the equal-interval-optical-frequency-comb generator 26 for generating frequencies of optical signals and clock signals to be input to the optical modulators 1 through 3 for determining Baud Rates are from the same reference clock 23. Accordingly, when the frequency of a clock signal from the reference clock 23 fluctuates, the optical frequency and the Baud Rate of a subcarrier will be influenced by the same fluctuation. This means that the optical frequency and Baud Rate of an sc (subcarrier) synchronize. Thereby, when an OFDM method is employed, OFDM conditions can be satisfied, and interference between signals can also be reduced.

ule. Thereafter, the setting information is transferred to individual setting units for performing the control.

As an example of a look-up table, there is a table on which, when an optical SNR is received as control information and that optical SNR is low, the multi-valued degree or the modulation rate is lowered, and thereby a modulation method yielding a relatively low error rate with respect to the optical SNR is set. Also, when the modulation method of an adjacent channel is 10G-OOK (intensity modulation) (i.e., when there is much interference to adjacent channels), the multi-valued degree of the transmission-reception module for the channel at the frequency adjacent to 10G-OOK is lowered, or the modulation rate is increased. Further, when information from the relay node indicates that the transmission bandwidth of the relay node is narrow, a modulation method employing a lower modulation rate and high frequency-use efficiency is used.

An example of a look-up table will be explained below.

TABLE 1

| CONTROL INFORMATION | | | | | |
|---|---|---|---|---|---|
| TRANSMISSION PROPERTY | CONTROL PLANE INFORMATION NMS/EMS | FREQUENCY | MODULATION DEGREE/ MODULATION RATE | | |
| MONITOR | INFORMATION | INTERVAL | Mod. 1 | Mod. 2 | Mod. 3 |
| OPTICAL SNR: HIGH NON-LINEAR PENALTY: LOW | TRANSMISSION VOLUME: LARGE TRANSMISSION DISTANCE: SHORT | 12.5 GHz | 16QAM/ 12.5G baud | 16QAM/ 12.5 Gbaud | 16QAM/ 12.5 Gbaud |
| OPTICAL SNR: LOW NON-LINEAR PENALTY: HIGH | TRANSMISSION VOLUME: INTERMEDIATE TRANSMISSION DISTANCE: LONG | 50 GHz | DP BPSK/ 50 Gbaud | DP QPSK/ 25 Gbaud | DP QPSK/ 25 Gbaud |
| . . . | . . . | . . . | . . . | . . . | . . . |

FIGS. 4 and 5 illustrate operations of controlling the transmitter control unit depicted in the configuration illustrated in FIG. 3.

The transmitter control unit 22 obtains control information as illustrated in FIG. 4 from the transmission property monitor 20, the NMS/EMS, or the control plane 21. Control information obtained from the transmission property monitor 20 includes, for example, an optical SNR, a non-linear penalty, cumulative wavelength dispersion, a transmission-bandwidth reduction penalty, and the like. Control information obtained from the NMS/EMS or the control plane 21 includes, for example, a required transmission volume, a required transmission distance, an applicable transmission bandwidth (contract contents, or degree of occupancy, or the like), the type of fiber (information about an amount of transmission loss, a mode field radius Aeff, wavelength dispersion, and the like), a span length, relay node information (information about fiber input power, a transmission bandwidth, the number of stages that each device has, and the like), the modulation methods/ modulation rates of adjacent channels, and the like.

Setting values for the optical frequency interval and the modulation degree/modulation rate of each transmission-reception module are determined according to the above control information and a look-up table containing relationships between the optical frequency interval and the modulation degree/modulation rate of each transmission-reception mod- In FIG. 5, the transmitter control unit 22, first in step S10, obtains control information from the transmission property monitor 20, the NMS/EMS, or the control plane 21. In step S11, the transmitter control unit 22 sets an optical frequency interval according to the control information, and also sets a modulation degree/modulation rate according to the look-up table. In step S12, the transmitter control unit 22 transfers the set information to respective setting units in the optical frequency multiplexer-demultiplexer setting unit 24, the optical-modulator-modulator setting unit 29, and the optical modulator electric-frequency-variable-multiplier multiplying-factor setting unit 31. The transmitter control unit 22 performs this operation each time the modification or the like of the modulation method or the optical frequency is needed.

Figure 6:
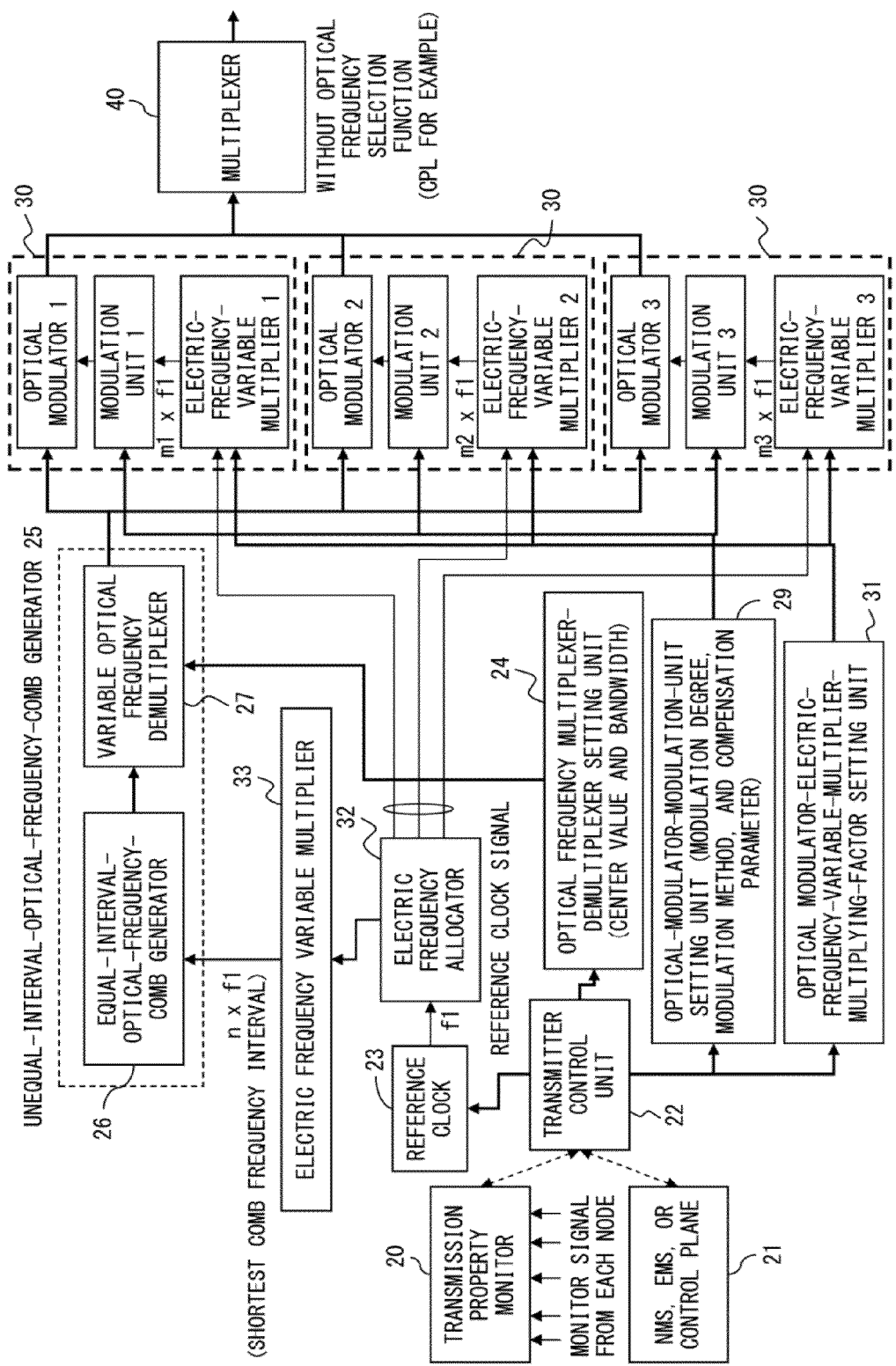
FIG. 6 illustrates a configuration example employing a less wavelength-dependent power multiplexer as a variable optical frequency multiplexer that multiplexes modulated optical signals in FIG. 3.

FIG. 6 illustrates a configuration example employing a less wavelength-dependent power multiplexer as a variable optical frequency multiplexer that multiplexes modulated optical signals.

In FIG. 6, the same constituents as those in FIG. 3 are denoted by the same symbols, and the explanations thereof will be omitted.

In FIG. 3, the configuration to multiplex optical signals from the respective transmission modules 30 employs a variable optical frequency multiplexer having a function to select optical frequencies. This employment makes it possible to select, after modulation, optical signals to be used, leaving optical signals not to be used. However, it is also possible to shut down optical modulators for optical signals not to be used. In such a case, all optical signals output from the transmission modules 30 are to be used, eliminating the necessity of the selection of optical frequencies after modulation. Accordingly, the multiplexing of optical signals is only needed after modulation, making it possible to provide, at a stage later than the transmission module 30, a multiplexer 40 such as a coupler (CPL), or the like that does not have an optical frequency selection function.

Figure 7:
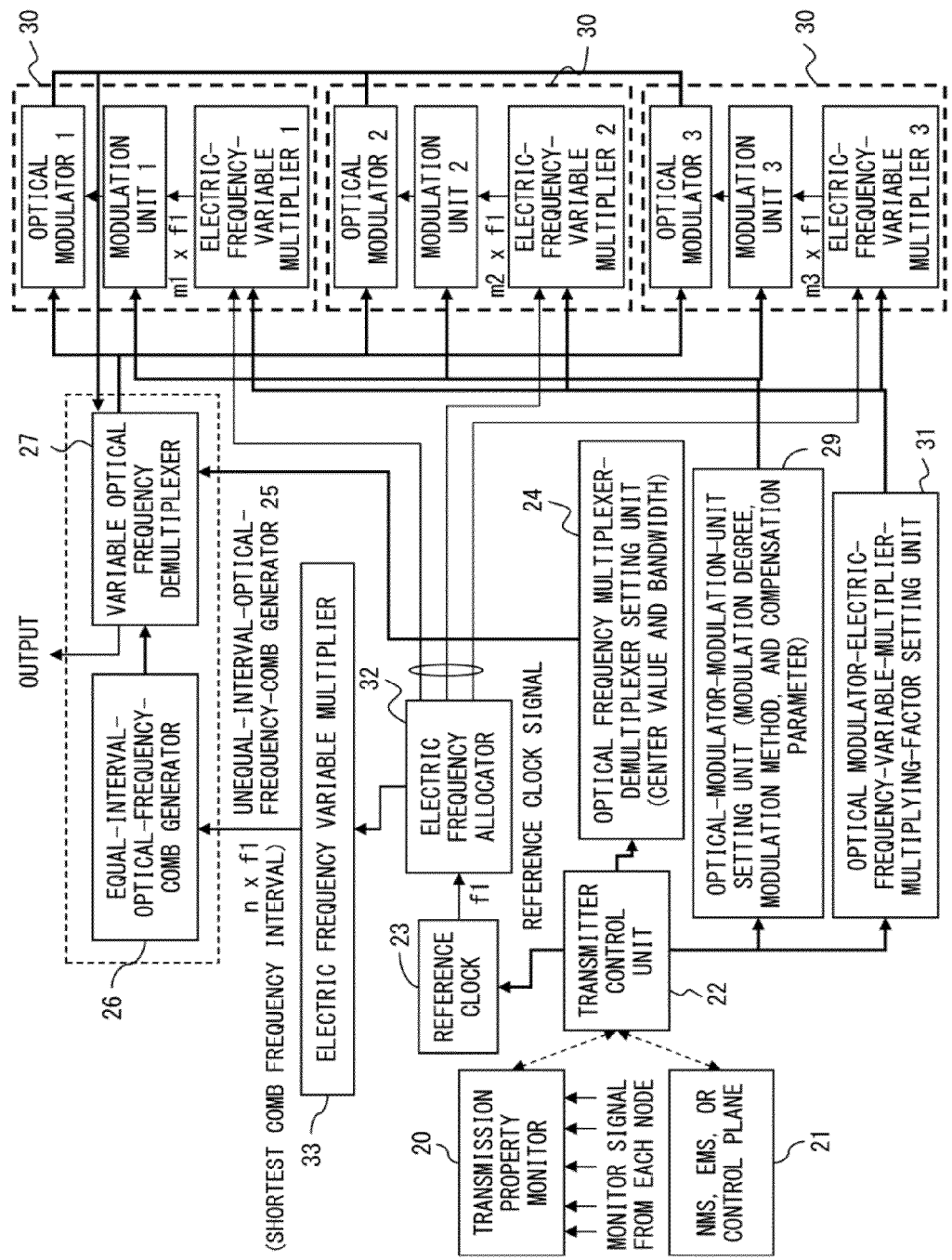
FIG. 7 illustrates a configuration example that uses, also as a multiplexer to multiplex modulated optical signals, a variable optical frequency demultiplexer disposed in an output unit of an equal-interval-optical-frequency-comb generator illustrated in FIG. 3.

FIG. 7 illustrates a configuration example that uses, also as a multiplexer to multiplex modulated optical signals, the variable optical frequency demultiplexers disposed in an output unit of the equal-interval-optical-frequency-comb generator illustrated in FIG. 3.

In FIG. 7, the same constituents as those in FIG. 3 are denoted by the same symbols, and the explanations thereof are omitted.

The configuration illustrated in FIG. 7 aims to reduce the number of components of the optical transmitter. Optical signals having respective frequencies output from the transmission modules 30 are input to the variable optical frequency demultiplexer 27 to be multiplexed and output. In such a case, a light beam from the equal-interval-optical-frequency-comb generator 26 and light beams from the optical modulators 1 through 3 in the transmission modules 30 are input to the variable optical frequency demultiplexer 27. A light beam from the equal-interval-optical-frequency-comb generator 26 is demultiplexed by the variable optical frequency demultiplexer 27 into continuous light beams having respective optical frequencies, while optical signals having respective optical frequencies from the transmission modules 30 are multiplexed. In such a case, light beams traveling in different directions are input simultaneously to the variable optical frequency demultiplexer 27, and accordingly, the variable optical frequency demultiplexer 27 is provided with optical circulators on its input and output sides so that light beams travelling in different directions can be distinguished from each other.

Figure 8:
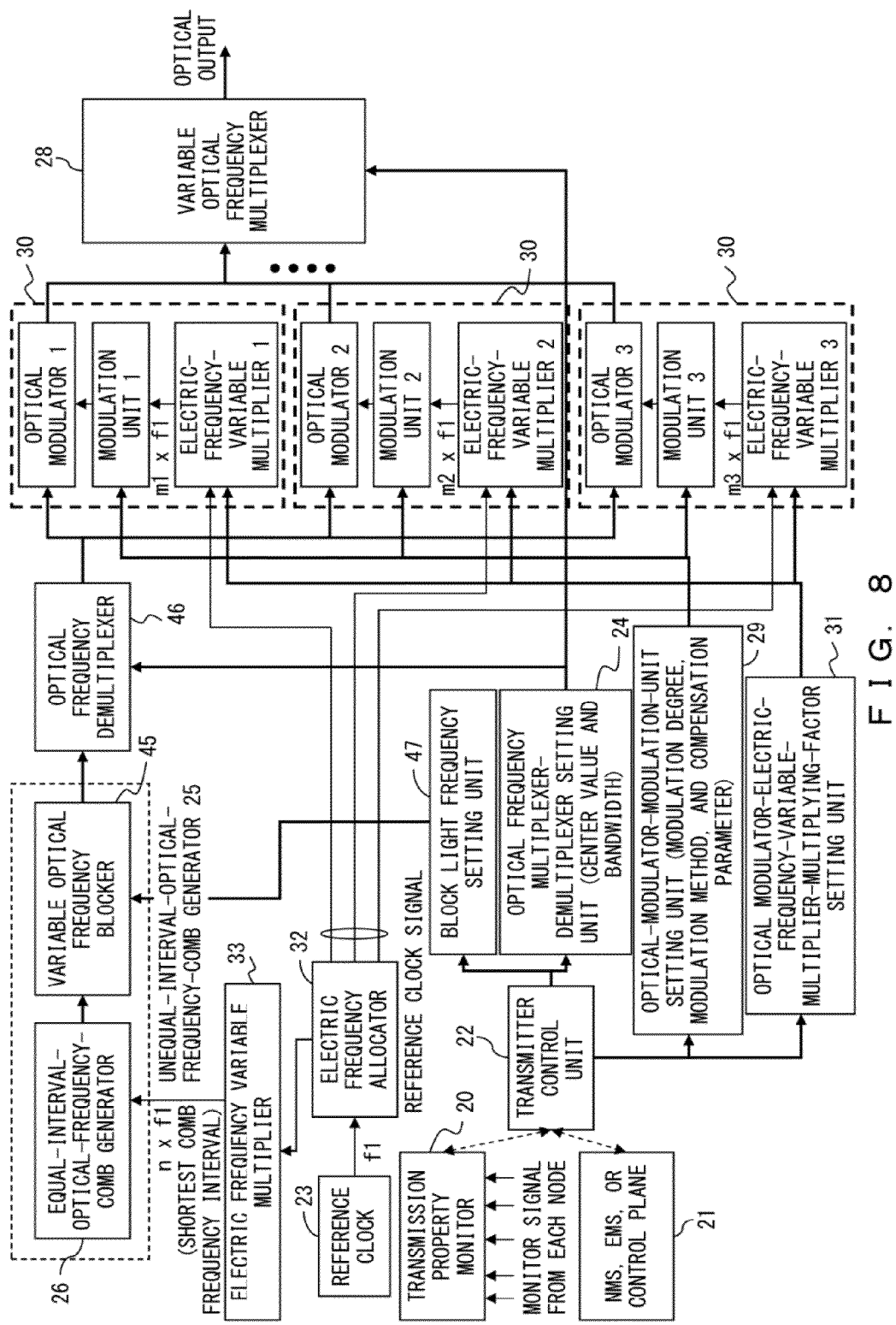
FIG. 8 illustrates an example of a configuration in which the equal-interval-optical-frequency-comb generator and the variable optical frequency blocker constitute an unequal-interval-optical-frequency-comb generator.

FIG. 8 illustrates an example of a configuration in which an equal-interval-optical-frequency-comb generator and a variable optical frequency blocker constitute an unequal-interval-optical-frequency-comb generator.

In FIG. 8, the same constituents as those in FIG. 3 are denoted by the same symbols, and the explanations thereof are omitted.

In FIG. 8, the equal-interval-optical-frequency-comb generator 26 and a variable optical frequency blocker 45 constitute the unequal-interval-optical-frequency-comb generator 25. The variable optical frequency blocker 45 includes an AOTF (Acousto-Optic Tunable Filter) and the like, and blocks optical frequencies set by a block light frequency setting unit 47 in order to prevent those frequencies from being transmitted. An optical frequency demultiplexer 46 is provided on the output side of the variable optical frequency blocker 45 so as to demultiplex continuous light beams output from the variable optical frequency blocker 45 into continuous light beams having respective optical frequencies. The optical frequency demultiplexer 46 does not have to be able to vary demultiplexed frequencies, and a fixed frequency type may be used. For example, the optical frequency demultiplexer 46 may be configured to demultiplex continuous light beams of all frequencies generated by the equal-interval-optical-frequency-comb generator 26. Frequencies to be employed are selected by the variable optical frequency blocker 45, and the optical frequency demultiplexer 46 is capable of demultiplexing continuous light beams of all frequencies generated by the equal-interval-optical-frequency-comb generator 26, and thus it is also capable of demultiplexing continuous light beams of selected frequencies.

The block light frequency setting unit 47 controls the variable optical frequency blocker 45 in accordance with a control signal indicating which frequency should be employed and which frequency should not be employed. This control signal is based on control information output from the transmitter control unit 22 and obtained from the transmission property monitor 20, the NMS/EMS, or the control plane 21.

Figure 9:
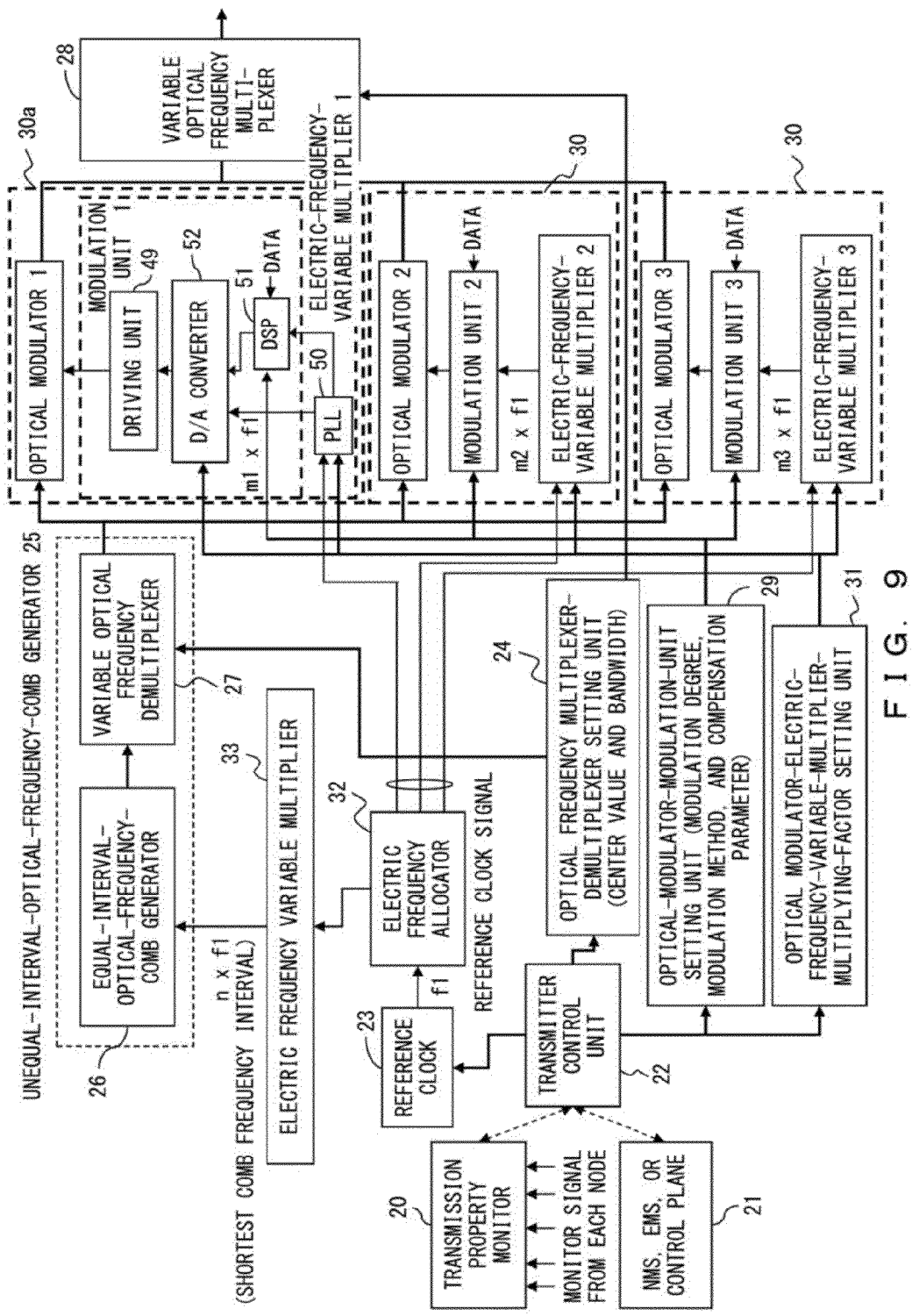
FIG. 9 illustrates an example in which a D/A converter is applied to a transmission module.

FIG. 9 illustrates an example in which a D/A converter is applied to an electric-frequency-variable multiplier in one of the transmission modules.

In FIG. 9, the same constituents as those in FIG. 3 are denoted by the same symbols, and the explanations thereof will be omitted.

FIG. 9 illustrates a configuration in which a signal is synchronized with a clock signal of the reference clock 23 by a PLL circuit 50 in a transmission-reception module 30a so as to generate a digital signal having a converted Baud Rate, and a DSP unit 51 and a D/A (Digital to Analog) converter 52 generate an analog signal so as to vary the modulation rate.

The configuration in FIG. 9 illustrates only the transmission-reception module 30a. However, PLL circuits, DSP units, and D/A converters may constitute the modulators 2 and 3 and the electric-frequency-variable multipliers 2 and 3.

The PLL circuit 50 outputs a digital periodic wave having a consistent phase relationship with a reference clock signal and having a prescribed electric frequency that has been synchronized with a reference clock signal. The prescribed electric frequency oscillated by the PLL circuit 50 may be a variable frequency in accordance with the setting of the PLL circuit 50. The oscillation frequency of the PLL circuit 50 is determined by setting performed by the optical modulator electric-frequency-variable-multiplier multiplying-factor setting unit 31. The DSP unit 51 receives data in response to output of a digital periodic wave from the PLL circuit 50, generates a digital signal having a converted Baud Rate, and inputs that digital signal to the D/A converter 52. The D/A converter 52 converts the digital signal from the DSP unit 51 into an analog signal to transfer the signal to a driving unit 49 in order to set the modulation rate of the optical modulator 1.

Figure 10:
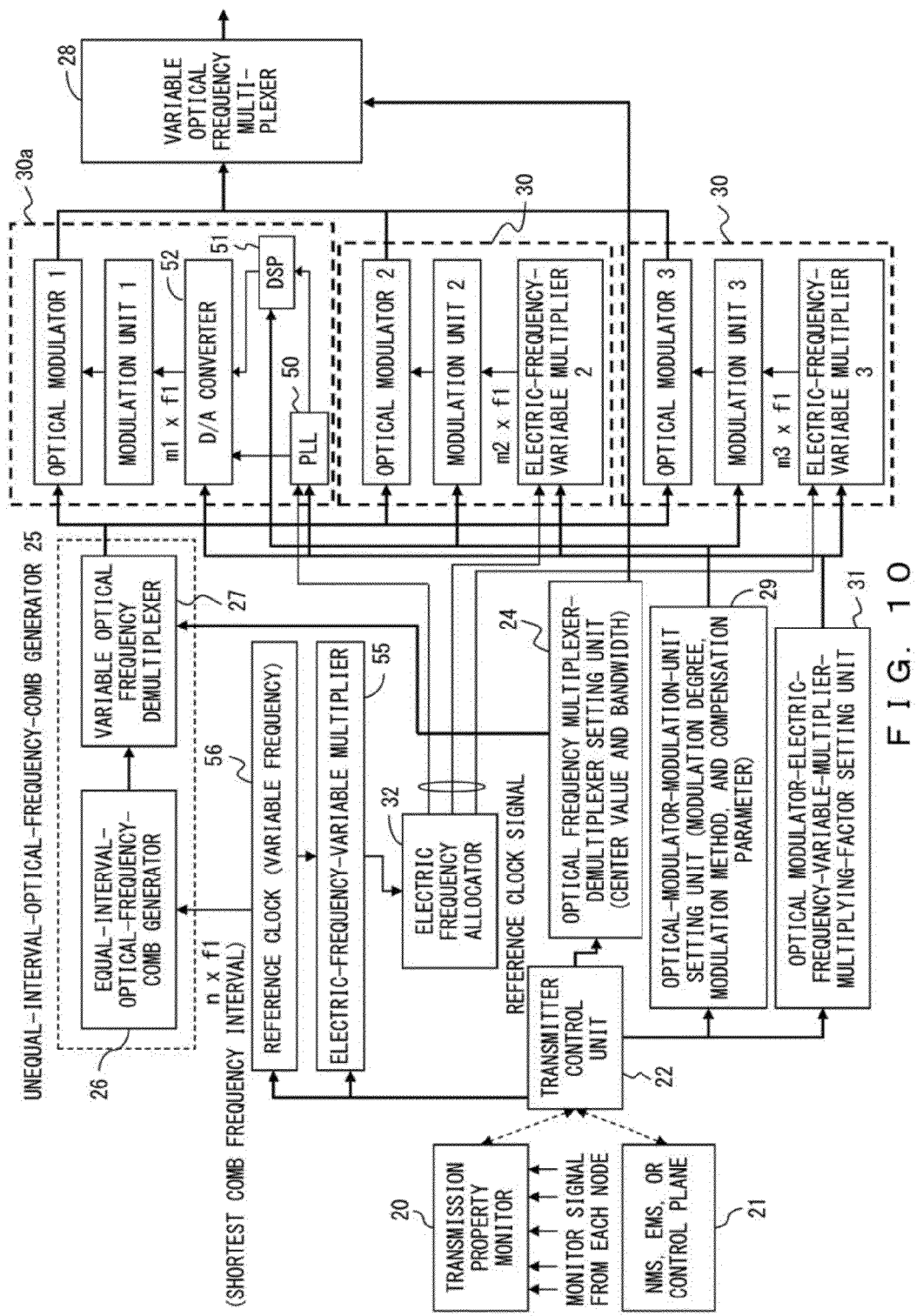
FIG. 10 illustrates a configuration example in which a clock signal from a reference clock is input directly as a setting clock for the equal-interval-optical-frequency-comb generator, a frequency varying function is added to that reference clock, and the modulation rate or the like is set by referring to a frequency input to the equal-interval-optical-frequency-comb generator.

FIG. 10 illustrates a configuration example in which a clock signal from a reference clock is input directly as a setting clock for an equal-interval-optical-frequency-comb generator, a frequency varying function is added to that reference clock, and the modulation rate is set by referring to a frequency input to the equal-interval-optical-frequency-comb generator.

In FIG. 10, the same constituents as those in FIG. 9 are denoted by the same symbols, and the explanations thereof will be omitted.

A reference clock to be referred to is not limited to a clock signal input to an equal-interval-optical-frequency-comb generator, and may be a reference clock that is applied to each transmission module. Further, in such a case, a configuration may be employed in which a PPL circuit is applied to each transmission module for performing synchronization.

In FIG. 10, a reference clock 56 provided with a frequency varying function is used. A plurality of continuous light beams having frequency intervals that correspond to the electric frequency of the clock signal oscillated by the reference clock 56 may be generated by inputting this clock signal to the equal-interval-optical-frequency-comb generator 26. Thus, the frequency intervals of a plurality of continuous light beams generated by the equal-interval-optical-frequencycomb generator 26 may be varied by varying the electric frequency of a clock signal oscillated by the reference clock.

Also, a clock signal oscillated by the reference clock 56 is input to electric-frequency-variable multipliers 55, is subjected to frequency conversion, is input to the electric frequency allocator 32, and is input to the transmission modules 30 and 30a as a clock signal.

Figure 11:
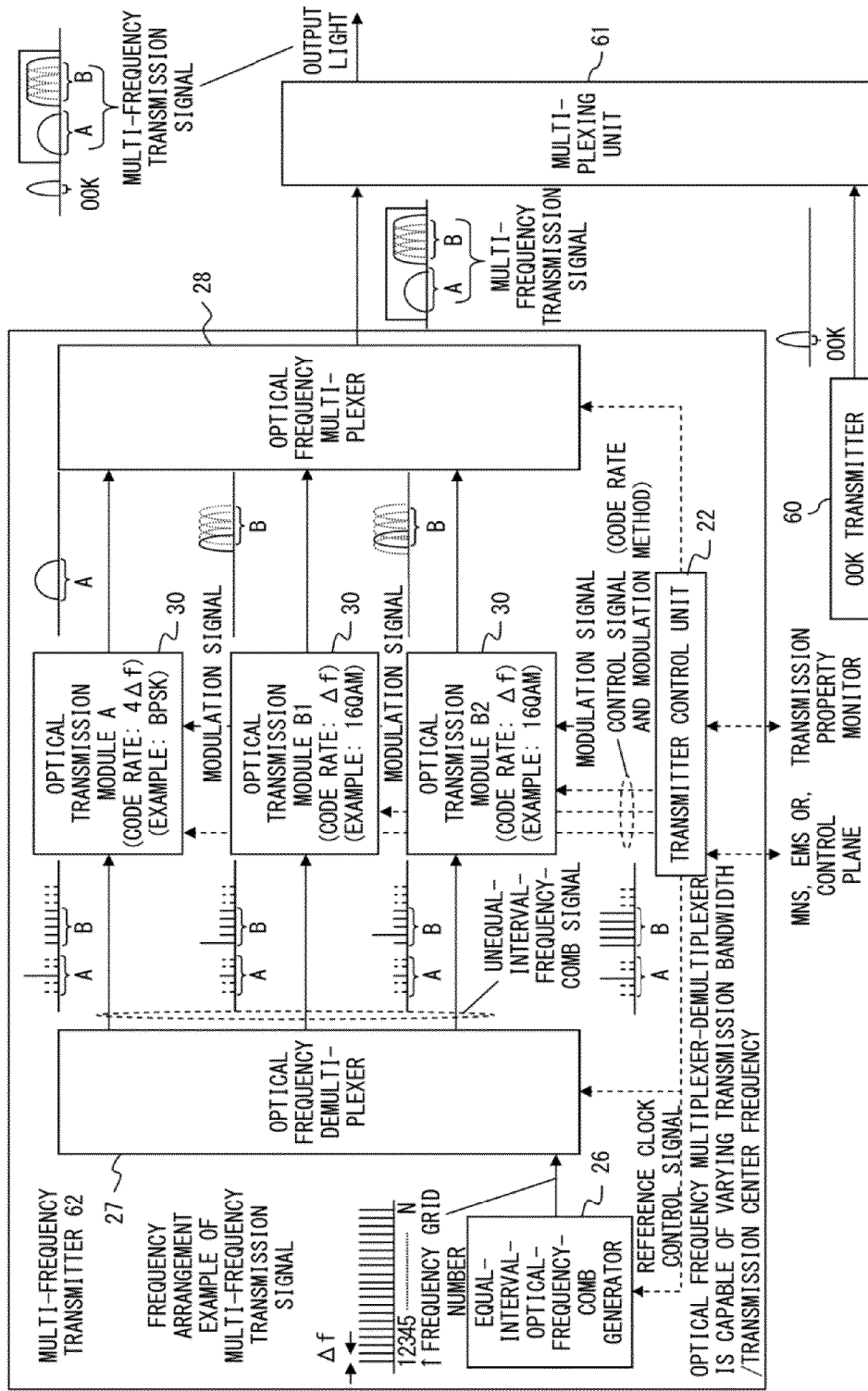
FIG. 11 illustrates a configuration example of an optical transmission device that uses a modulation method/modulation rate variable multi-frequency transmitter according to the present embodiment.

FIG. 11 illustrates a configuration example of an optical transmission device that uses a modulation method/modulation rate variable multi-frequency transmitter according to the present embodiment.

In the optical transmission device illustrated in FIG. 11, a multi-frequency transmitter 62 and an OOK transmitter 60 are arranged so that optical signals from them are multiplexed by a multiplexer 61 to be output as an output signal. In addition, while an optical signal in an adjacent channel of the optical signal output from the multi-frequency transmitter 62 is represented as an OOK signal output from the OOK transmitter 60, combinations with optical signals based on other methods may be used.

According to information from the NMS/EMS or the control plane, and the transmission property monitor, the transmitter control unit 22 outputs a reference clock and a control signal to respective units. A reference clock is input to the equal-interval-optical-frequency-comb generator 26. The equal-interval-optical-frequency-comb generator 26 outputs N continuous light beams having, as their frequency intervals, frequency $\Delta f$ of the reference clock.

The variable optical frequency demultiplexer 27 is a demultiplexer that is capable of varying the transmission bandwidth and the transmission center frequency, and selects N continuous light beams from the equal-interval-optical-frequency-comb generator 26 so as to allow the selected beams to pass in accordance with a control signal from the transmitter control unit 22. Due to the fact that continuous light beams having equal frequency intervals are selectively allowed to pass, a frequency comb signal having unequal intervals can be obtained. This signal is input to the transmission module 30, and thereby optical signals of respective modulation rates and modulation methods are generated.

In FIG. 11, an example is illustrated in which the code rate and the modulation method for optical transmission module A are $4\Delta f$ and BPSK, respectively, the code rate and the modulation method for optical transmission module B1 are $\Delta f$ and 16QAM, respectively, and the code rate and the modulation method for optical transmission module B2 are $\Delta f$ and 16QAM, respectively. However, this is only exemplary, thus allowing for various combinations of code rates and modulation methods.

Optical signals from the optical transmission modules 30 are multiplexed by the optical frequency multiplexer 28 so as to be converted into a multi-frequency transmission signal, and thereafter the signal is multiplexed with a signal of an adjacent channel by a multiplexing unit 61 to be output.

Figure 12:
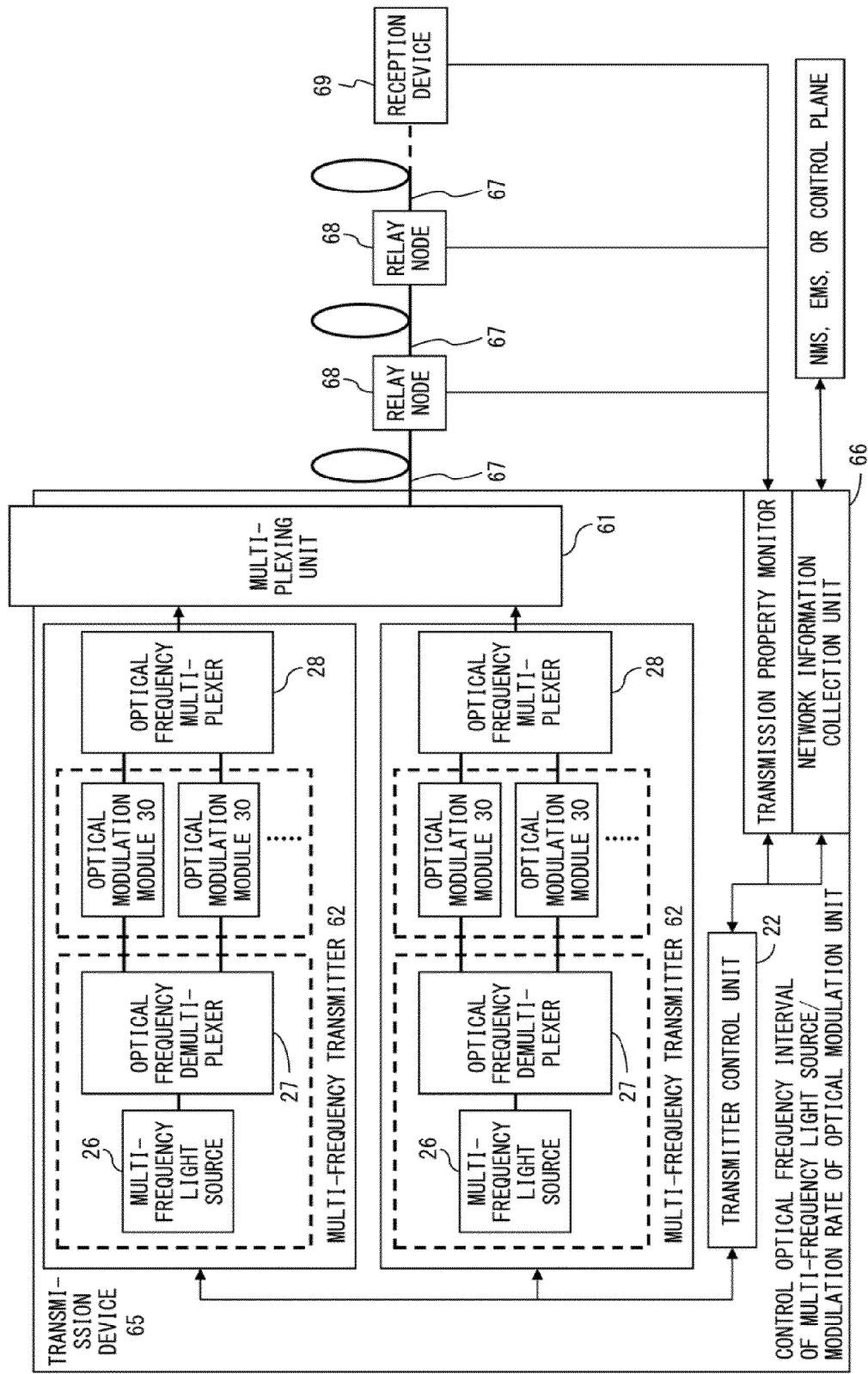
FIG. 12 illustrates a configuration example of an optical transmission system that uses a modulation method/modulation rate variable multi-frequency transmitter according to the present embodiment.

FIG. 12 illustrates a configuration example of an optical transmission system that uses a modulation method/modulation rate variable multi-frequency transmitter according to the present embodiment.

The optical transmission system includes a transmission device 65, a reception device 69, and relay nodes 68, and they are connected to each other through a transmission path 67. As has been described in the above embodiment, the transmission device 65 includes a plurality of multi-frequency transmitters 62. Although not illustrated in FIG. 12, the transmission device 65 may be provided with an OOK transmitter in addition to the multi-frequency transmitters 62, as illustrated in FIG. 11. Optical signals from the respective transmitters are multiplexed by the multiplexing unit 61 so as to be output to the transmission path 67.

The transmission device 65 includes a transmission property monitor to monitor parameters, etc., of transmission properties measured by the relay nodes 68 and the reception device 69, and also includes a network information collection unit 66 to collect network information from the NMS/EMS or the control plane. Although not illustrated in FIGS. 3 through 10, the network information collection unit 66 is actually provided as an interface with the NMS/EMS or the control plane. The transmitter control unit 22 controls the multi-frequency transmitter 62 on the basis of information from the transmission property monitor or the network information collection unit 66.

As has been described in the present embodiment, the multi-frequency light source (equal-interval-optical-frequency-comb generator) 26, (variable) optical frequency demultiplexer 27, the transmission modules 30, and the (variable) optical frequency multiplexer 28 are provided in the multi-frequency transmitter 62. Optical frequency intervals of the equal-interval-optical-frequency-comb generator 26 are controlled by the transmitter control unit 22. A plurality of light beams having equal or unequal frequency intervals are generated by the equal-interval-optical-frequency-comb generator 26 and the variable optical frequency demultiplexer 27.

Also, modulation rates and the modulation methods of the optical transmission module 30 are controlled by the transmitter control unit 22. Thereby, optical signals based on various Baud Rates and modulation methods (multi-valued degree) are generated for each optical frequency.

Figure 13:
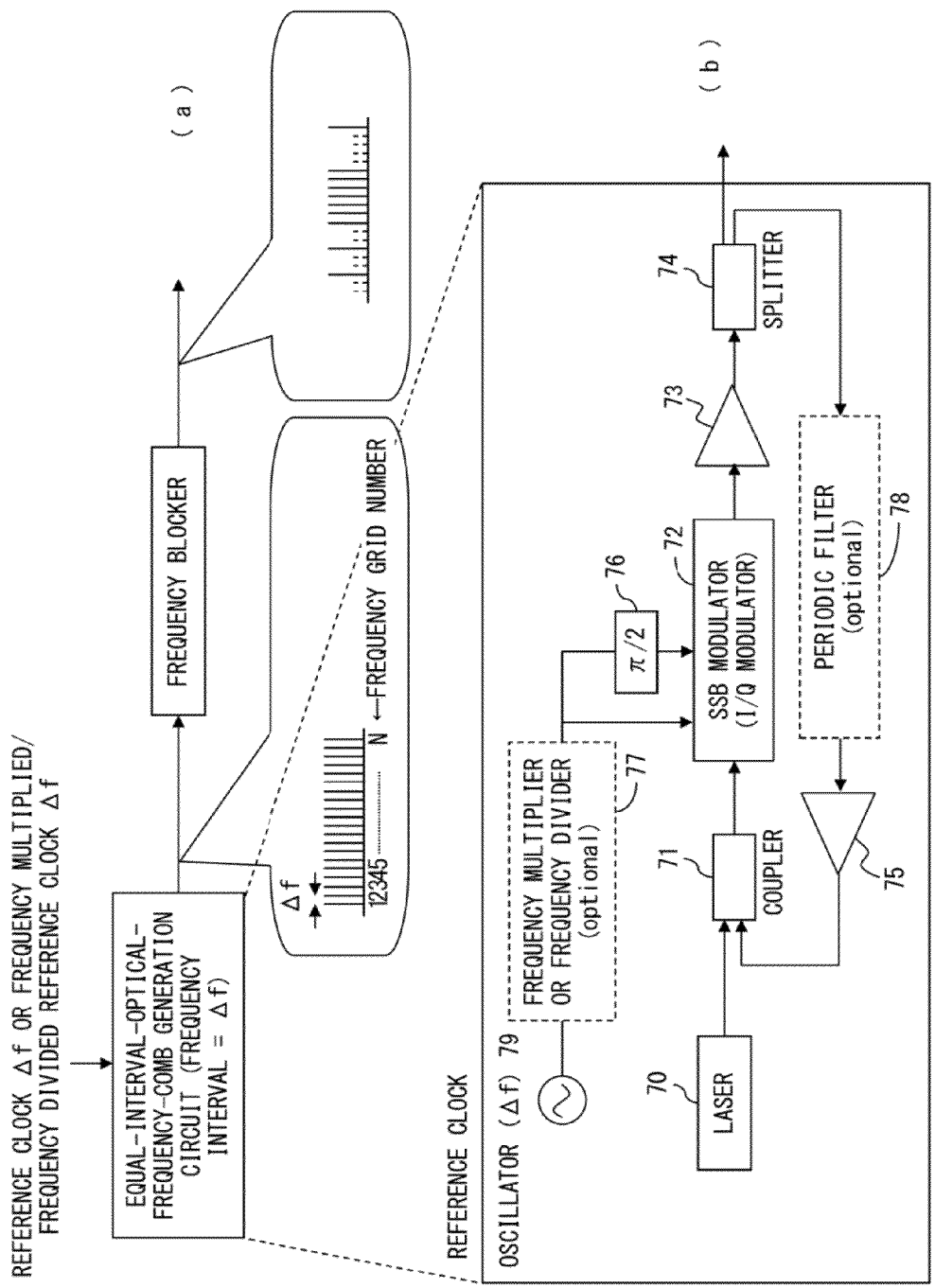
FIG. 13 illustrates a configuration example of the unequal-interval-optical-frequency-comb generator.

FIG. 13 illustrate a configuration example of an unequal-interval-optical-frequency-comb generator.

As illustrated in FIG. 13(a), it is possible to generate an optical frequency comb having unequal intervals by using a frequency blocker to block continuous light having unnecessary optical frequencies among outputs from an equal-interval-optical-frequency-comb generation circuit that generates a plurality of continuous light beams having equal frequency intervals $\Delta f$.

By using a frequency blocker to block part of N continuous light beams having adjacent optical frequencies, it is possible to generate a frequency interval of $(N+1)\Delta f$. A clock signal having an electric frequency $\Delta f$ output from the reference clock or a clock signal that has been frequency multiplied or frequency divided is input to the equal-interval-optical-frequency-comb generation circuit. When the electric frequency of a clock to be input to the equal-interval-optical-frequency-comb generation circuit is $\Delta f$, an optical frequency comb with frequency intervals of $\Delta f$ is generated. Similarly, when $\Delta f$ is frequency multiplied by a prescribed value, an optical frequency comb having frequency intervals corresponding to the frequency obtained by frequency-multiplying $\Delta f$ by the prescribed value is generated, and when $\Delta f$ is frequency divided by a prescribed value, an optical frequency comb having frequency intervals corresponding to the frequency obtained by frequency-dividing $\Delta f$ by the prescribed value is generated.

An exemplary configuration of an equal-interval-optical-frequency-comb generation circuit is illustrated in FIG. 13(b). A continuous light having a single frequency output from a laser 70 passes through a coupler 71, and is input to an SSB (Single Side Band) modulator (I/Q modulator) 72. A periodic signal from an oscillator 79 of the reference clock and a signal obtained by shifting the phase of the periodic signal by $\pi/2$ by using a $\pi/2$-phase shifter are input to the SSB modulator 72. When the SSB modulator 72 is operated using these two periodic signals, a frequency component of a side band is generated on one side with respect to a position on the frequency axis of the input continuous light beam. The difference between the optical frequency of the side band and the optical frequency of the input continuous light beam corresponds to the electric frequency of the periodic wave input to the SSB modulator.

As periodic waves to be input to the SSB modulator 72, oscillation frequency Δf of the oscillator 79 as it is, a frequency obtained by frequency multiplying this oscillation frequency Δf by using a frequency multiplier 77, or a frequency obtained by frequency dividing this oscillation frequency Δf by using a frequency divider 77 are possible. Output from the SSB modulator 72 is output after being amplified by an amplifier 73, while part of the output is split by a splitter 74. Outputs after being split are amplified by an amplifier 75 to be input to the SSB modulator 72 again via the coupler 71.

Thereby, side band components of a laser beam generated by the SSB modulator 72 are input to the SSB modulator 72, and accordingly further side band components are generated in response to this side band. This effect is repeatedly caused by a feed-back loop between the splitter 74 and the coupler 71, and thus side band components are generated one after another, leading to generation of an optical frequency comb.

In this configuration, it is also possible to optionally provide a periodic filter 78 between the splitter 74 and the amplifier 75. This periodic filter 78 selects an optical frequency to be input again to the SSB modulator 72 via a feed-back loop. Light that has passed through the feed-back loop is input to the SSB modulator 72 again for further generation of a sideband component. However, it is possible to prevent the generation of a side band of light having blocked frequencies by using the periodic filter 78 to block light having prescribed optical frequencies. Thereby, the number of frequencies of a frequency comb generated by the equal-interval-optical-frequency-comb generation circuit may be limited.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention has (have) been described in detail, it should be understood that the various changes, substitutions, and alterations could be made hereto without departing from the spirit and scope of the invention.

What is claimed is:

1. An optical transmitter, comprising:
    a reference clock generation oscillator configured to oscillate a reference clock signal;
    a multi-frequency phase-synchronized light source configured to generate a plurality of continuous light beams having a frequency interval based on a clock signal that is an integral multiple of the reference clock signal and having synchronized optical phases;
    a frequency interval setting unit configured to perform setting so that an interval of the multi-frequency phase-synchronized light source is varied for each frequency;
    a frequency selection demultiplexer configured to selectively transmit the plurality of continuous light beams generated by the multi-frequency phase-synchronized light source according to the setting so as to demultiplex the transmitted continuous light beams; and
    a plurality of optical modulators configured to modulate light for each optical frequency from the frequency selection demultiplexer so that frequencies of the frequency interval of the multi-frequency phase-synchronized light source and frequencies of modulation of the optical modulators are synchronized with each other by using a clock signal that is an integral multiple of the reference clock signal.

2. The optical transmitter according to claim 1, further comprising:
    a frequency-variable multiplier configured to generate the clock signal that is an integral multiple of the reference clock signal in accordance with the reference clock signal.

3. The optical transmitter according to claim 1, wherein:
    the frequency selection demultiplexer is capable of varying an optical frequency or an optical frequency bandwidth to be transmitted selectively.

4. The optical transmitter according to claim 1, further comprising:
    a multiplexer configured to multiplex optical signals output from the plurality of optical modulators.

5. The optical transmitter according to claim 4, wherein:
    the multiplexer is capable of varying optical frequencies of optical signals that are to be multiplexed.

6. The optical transmitter according to claim 1, wherein:
    the frequency selection demultiplexer includes:
        a variable frequency blocker capable of varying an optical frequency that is not to be transmitted; and
        a demultiplexer configured to demultiplex light that has been transmitted through the variable frequency blocker.

7. The optical transmitter according to claim 1, wherein:
    the plurality of optical modulators includes:
        a PLL circuit that outputs a digital periodic wave having a phase synchronized with that of the clock signal and that is capable of varying a frequency of the periodic wave; and
        a digital-analog converter to convert output of the PLL circuit into an analog signal.

8. An optical transmission device comprising:
    the optical transmitter according to claim 1.

9. An optical transmission system, comprising:
    the optical transmitter according to claim 1.

10. The optical transmitter according to claim 1, wherein:
    the multi-frequency phase-synchronized light source includes:
        a laser;
        a modulator that operates in accordance with the clock signal or the frequency-converted clock signal so as to modulate continuous light beams from the laser; and
        a feed-back pathway to input, again to the modulator, output from the modulator.

11. The optical transmitter according to claim 10, wherein:
    the clock signal or the frequency-converted clock signal and a periodic wave obtained by shifting these clock signals by n/2 are applied as driving signals to the modulator.

12. The optical transmitter according to claim 10, wherein:
    the feed-back pathway is provided with a filter that selectively transmits only light having a prescribed optical frequency.

13. The optical transmitter according to claim 1, further comprising
    a collector configured to collect control information of an optical communication network to which the optical transmitter transmits optical signals, wherein
    the frequency interval setting unit performs setting so that the interval of the multi-frequency phase-synchronized light source is varied for each frequency according to a predetermined condition based on the collected control information.

* * * * *